US012017617B2

(12) United States Patent
Pilkington (10) Patent No.: US 12,017,617 B2
(45) Date of Patent: Jun. 25, 2024

(54) VEHICLE CARGO RACK SYSTEM WITH POWERED LIFT

(71) Applicant: John F. Pilkington, Raleigh, NC (US)

(72) Inventor: John F. Pilkington, Raleigh, NC (US)

(*) Notice: Subject to any disclaimer, the term of this patent is extended or adjusted under 35 U.S.C. 154(b) by 827 days.

(21) Appl. No.: 17/114,482

(22) Filed: Dec. 7, 2020

(65) Prior Publication Data

US 2022/0176883 A1    Jun. 9, 2022

(51) Int. Cl.
*B60R 9/042*    (2006.01)
(52) U.S. Cl.
CPC .................................. *B60R 9/042* (2013.01)
(58) Field of Classification Search
CPC ........ B60R 9/042; B60R 9/0423; B60R 9/048
USPC .................................................. 414/462, 743
See application file for complete search history.

(56) References Cited

U.S. PATENT DOCUMENTS

| | | | | |
|---|---|---|---|---|
| 2,828,035 A * | 3/1958 | Kuchinskie | ............. | B60R 9/042 414/462 |
| 3,495,729 A * | 2/1970 | Kruse | .................. | B60P 3/1025 224/310 |
| 3,720,334 A * | 3/1973 | Permut | .................. | B60R 9/042 414/607 |
| 4,339,223 A | 7/1982 | Golze | | |
| 4,439,086 A * | 3/1984 | Thede | ....................... | B60R 9/08 224/310 |
| 5,850,891 A * | 12/1998 | Olms | .................... | B60R 9/0423 224/310 |
| 7,226,266 B2 * | 6/2007 | Henderson | ............. | B60R 9/042 414/466 |
| 7,513,730 B2 | 4/2009 | Goyanko | | |
| 2006/0285954 A1 * | 12/2006 | Neary | ..................... | B60R 9/042 414/465 |
| 2018/0079345 A1 * | 3/2018 | Sawatzky | ............... | B60P 1/022 |

* cited by examiner

*Primary Examiner* — Saul Rodriguez
*Assistant Examiner* — Brendan P Tighe
(74) *Attorney, Agent, or Firm* — LaMorte & Associates P.C.

(57) ABSTRACT

A cargo rack system having a base framework that attaches to a vehicle. The base framework has an inclined framing element and a horizontal framing element. Linkage mounts are disposed within the interior of the framing elements, wherein the linkage mounts are accessible through slots. A linear actuator reciprocally moves the linkage mounts between a first position and a second position. A cargo frame is provided. Linkages connect the cargo frame to the linkage mounts moved by the linear actuator. The linkages move the cargo frame between a first configuration, wherein the primary plane of the cargo frame is parallel to the inclined framing element, and a second configuration, wherein the primary plane of the cargo frame is parallel to the horizontal framing element. The cargo frame has extension arms that can be selectively extended and retracted in the primary plane.

18 Claims, 9 Drawing Sheets

VEHICLE CARGO RACK SYSTEM WITH POWERED LIFT

BACKGROUND OF THE INVENTION

1. Field of the Invention

In general, the present invention relates to cargo racks that attach to pick-up trucks and work vans. More particularly, the present invention relates to cargo racks that have powered lift systems for assisting in loading large and/or heavy objects onto the cargo rack.

2. Prior Art Description

Many people own pick-up trucks, vans and other such vehicles and use those vehicles to transport equipment and other objects. Often the objects being transported do not fit within the bed of the pick-up truck or the cargo bay of the van. Large or long objects, such as ladders, kayaks, plywood, dry wall and the like are therefore often carried on the roof of the vehicle. In order to prevent damage to the roof of the vehicle, a cargo rack is typically installed on the roof or over the truck bed. The larger objects to be transported are then affixed to the cargo rack.

Although cargo racks are useful in carrying various objects, they do have significant limitations. If a roof rack is attached to the roof of a truck or van, the roof rack is typically six to nine feet above the ground. This means that the object to be carried must be hoisted up six to nine feet and moved laterally onto the cargo rack. Such a maneuver is very difficult and dangerous. The difficultly and danger increases with the weight and bulk of the object being transported.

Recognizing that it is difficult to load cargo racks with large and/or heavy objects, many specialized cargo racks have been developed. Specialized cargo racks typically tilt or have a descending loading platform. This enables the object being loaded to be attached to the cargo rack at a lower elevation. The cargo rack then utilizes a winch or similar mechanism to raise the loading platform and its load onto the roof. Such prior art cargo racks are exemplified by U.S. Pat. No. 4,339,223 to Golze, U.S. Pat. No. 2,828,035 to Kuchinskie, and U.S. Pat. No. 3,495,729 to Kruse.

Although cargo racks with loading platforms that can be lowered are useful, they also have limitations. Cargo racks with loading platforms that lower typically do not lower to ground level. As such, the load must be manually lifted onto the loading platform a few feet above the ground. This limits the use of the cargo rack for many people. Additionally, in order to lift and support heavy loads, the roof rack itself must also be made strong and heavy. Accordingly, the roof rack is often as heavy, or heavier, than the load is it being used to carry.

All vehicles have a roof load capacity. The roof load capacity usually does not correlate to the strength of the vehicle roof. Rather, the roof load capacity correlates with the vehicle's center of gravity and roll-over characteristics. Vehicles with heavy loads on their roofs have a higher center of gravity. As such, they are more likely to roll over during accidents and during sharp turns. Typically the roof capacity of a vehicle is between one-hundred fifty and eight hundred pounds, depending upon the vehicle type and model. If the cargo rack itself weighs over 150 pounds, it may be unsafe to place any additional load upon that cargo rack.

As a result, a need exists for an improved cargo rack with a loading platform that is light weight and has a low center of gravity, yet enables heavy loads to be safely and easily loaded. This need is met by the present invention as described and claimed below.

SUMMARY OF THE INVENTION

The present invention is a cargo rack system for a truck or van that assists in raising a load to the top of the vehicle. The cargo rack system has a base framework that attaches to the truck or van. The base framework has an inclined framing element and a horizontal framing element. The horizontal framing element mounts over the bed of the truck or the roof of a van. The inclined framing element angles downward from the horizontal framing element along the side of the vehicle. The inclined framing element and the horizontal framing element are hollow and interconnect to define an interior. Slots are formed in both the inclined framing element and the horizontal framing element to access the interior.

Linkage mounts are disposed within the interior of the framing elements, wherein the linkage mounts are accessible through the slots. A linear actuator is supported by the base framework. The linear actuator reciprocally moves the linkage mounts between a first position and a second position within the slots.

A cargo frame is provided. The cargo frame extends in a primary plane. Linkages connect the cargo frame to the linkage mounts moved by the linear actuator. The linkages move the cargo frame between a first configuration, wherein the primary plane of the cargo frame is parallel to the inclined framing element, and a second configuration, wherein the primary plane of the cargo frame is parallel to the horizontal framing element. The cargo frame has extension arms that can be selectively extended and retracted in the primary plane.

To utilize the cargo rack system, the base framework is mounted to a vehicle. The cargo frame is lowered to an inclined position and the extension arms are extended. A load can then be placed on the extension arms. The extension arms retract and lift the load onto the cargo frame. The cargo frame is then moved with the load to a position atop the base framework. Thus, the load is lifted atop the vehicle without much labor.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention vehicle rack system can be embodied in many ways, the illustrations show only a few embodiments of the invention. The embodiments are selected in order to set forth some of the best modes contemplated for the invention. The illustrated embodiments, however, are merely exemplary and should not be considered limitations when interpreting the scope of the appended claims.

Figure 1:
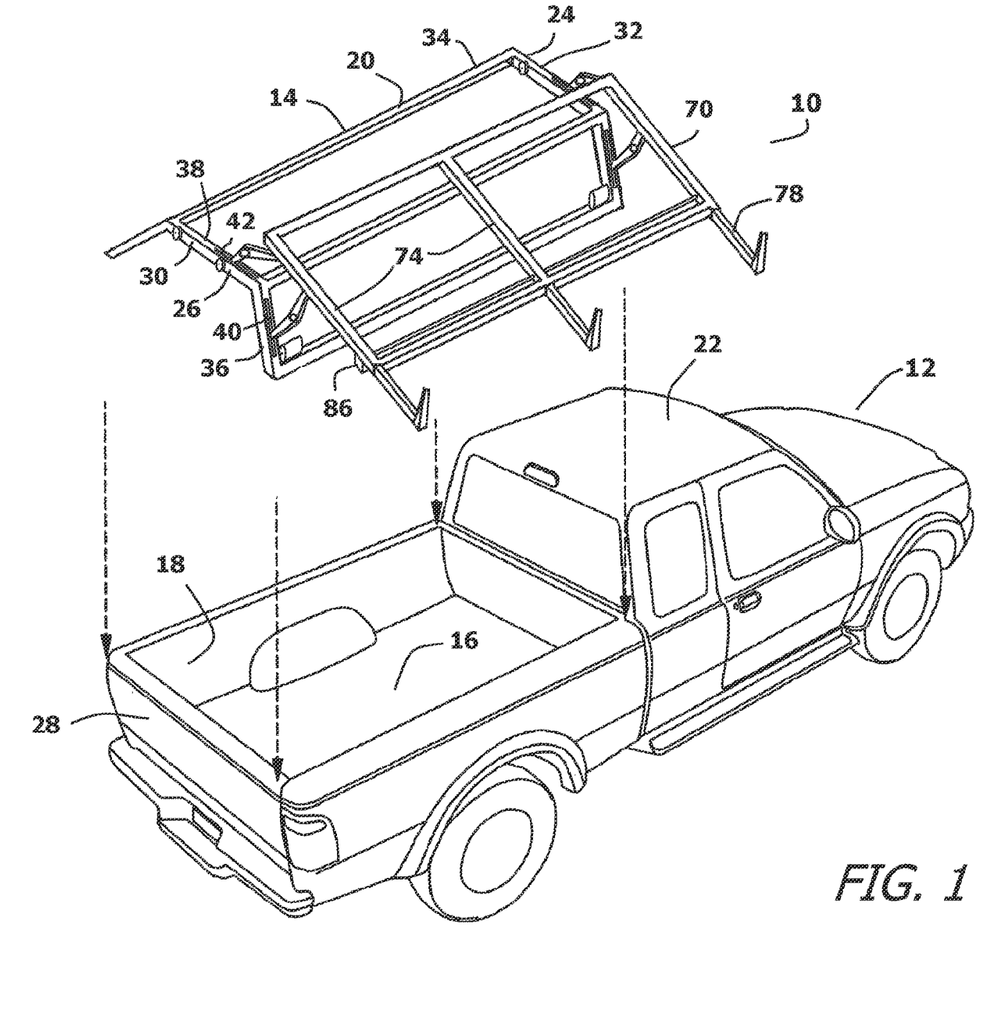
FIG. 1 is a perspective view of an exemplary embodiment of a cargo rack system shown in conjunction with a pick-up truck.
Figure 2:
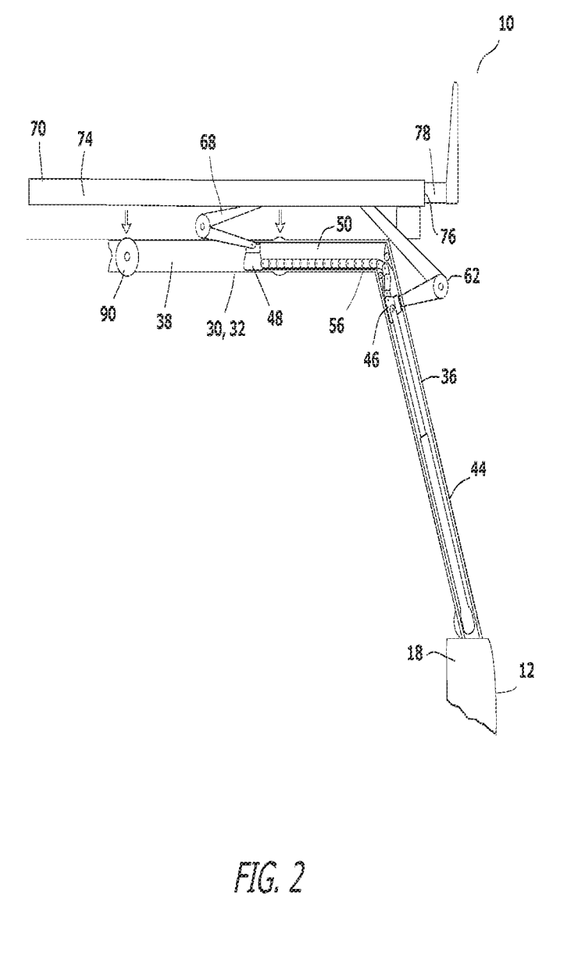
FIG. 2 is a fragmented side view of the cargo rack system of FIG. 2 shown in its retracted configuration.
Figure 3:
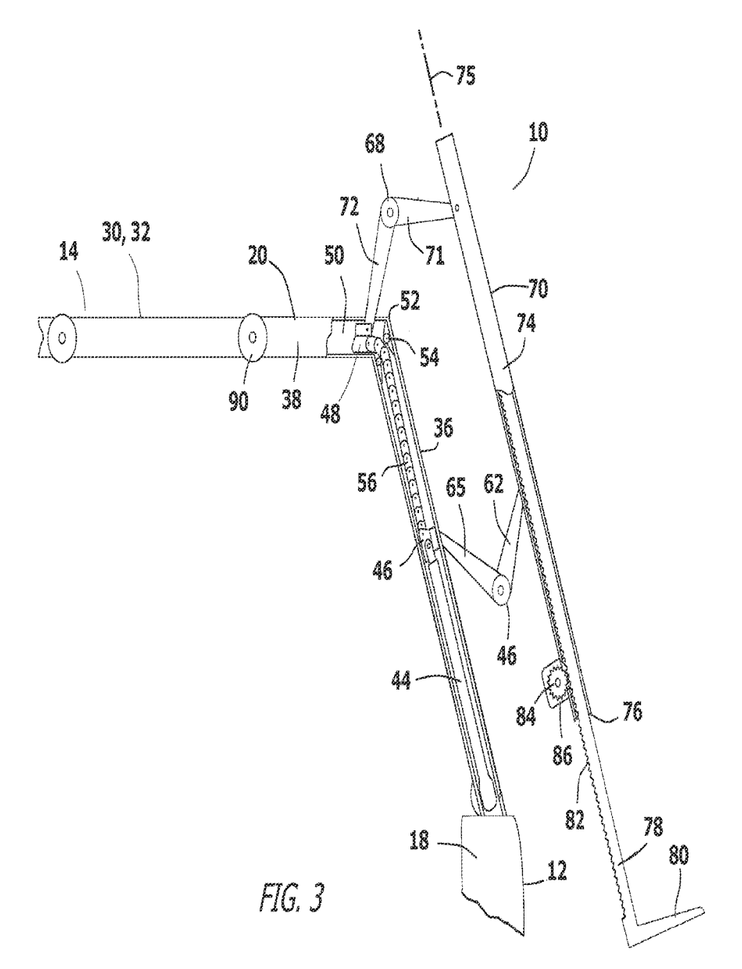
FIG. 3 is a fragmented side view of the cargo rack system of FIG. 1 shown in its extended configuration.

Referring to FIG. 1, FIG. 2 and FIG. 3, a cargo rack system 10 is shown for a pick-up truck 12. The cargo rack system 10 includes a static base framework 14. The static base framework 14 is a rigid structure that rigidly mounts to either the bed floor 16 of the pick-up truck 12 or to the top of the bed walls 18 of the pick-up truck 12. The static base framework 14 defines a top surface 20 that is elevated above the bed of the pick-up truck 12. Preferably, the top surface 20 is elevated to a height at least as high as the roof of the cab 22 on the pick-up truck 12. In this manner, the cab 22 does not interfere with any objects that may be placed upon the top surface 20 of the static base framework 14.

The static base framework 14 has a first end 24 and an opposite second end 26. The first end 24 is positioned near the cab 22 of the pick-up truck 12. The second end 26 is positioned near the tailgate 28 of the pick-up truck 12. The static base framework 14 includes a first truss structure 30 at the first end 24 of the static base framework 14 and a second truss structure 32 at the second end 26 of the static base framework 14. The first truss structure 30 and the second truss structure 32 are interconnected by a variety of crossbars 34. The crossbars 34 are welded to the first truss structure 30 and the second truss structure 32, therein forming the complete static base framework 14.

The first truss structure 30 and the second truss structure 32 have the same size and configuration. Both the first truss structure 30 and the second truss structure 32 have an inclined framing element 36 and a horizontal top framing element 38. The inclined framing element 36 is offset from the horizontal top framing element 38 by an angle of between twenty-five degrees and ninety degrees. The inclined framing element 36 and the horizontal top framing element 38 are hollow and interconnect to form a common interior 50. Both the inclined framing element 36 and the horizontal top framing element 38 contain slots 40, 42. The slots 40, 42 provide access to the common interior 50 of both the first truss structure 30 and second truss structure 32.

At least one linear actuator 44 is provided within both the first truss structure 30 and the second truss structure 32. The purpose of each linear actuator 44 is to reciprocally move two linkage mounts 46, 48 within the inclined framing element 36 and the horizontal top framing element 38 so that the linkage mounts 46, 48 move along the length of each of the slots 40, 42. The linear actuators 44 are mechanical actuators with electrical motors and can be either screw type mechanical linear actuators or wheel and axle type mechanical linear actuators. Screw type linear actuators include leadscrew actuators, screw jack actuators, ball screw actuators and roller screw actuators. The wheel and axle mechanical linear actuators include hoist actuators, winch actuators, rack and pinion actuators, chain drive actuators and belt drive actuators. It will be understood that although electrical driven linear activators are preferred, manually powered linear activators can be substituted.

In the shown embodiment, both the first truss structure 30 and the second truss structure 32 share a common interior 50 that progresses through a bend 52. A guide roller 54 is positioned within the interior 50 at the bend 52. A belt 56 is provided within the interior 50 that is guided through the bend 52 by the guide roller 54. The belt 56 has a first section 58 that extends into the inclined framing element 36 and a second section 60 that extends into the horizontal top framing element 38. The lower linkage mount 46 is attached to the belt 56 within the inclined framing element 36. The upper linkage mount 48 is attached to the belt 56 within the horizontal top framing element 38. The belt 56 is attached to the mechanical linear actuator 44. As the mechanical linear actuator 44 is operated, it moves the belt 56 within the inclined framing element 36 and the horizontal top framing element 38. The movement provided by the mechanical linear actuator 44 is reciprocal. The lower linkage mount 46 and the upper linkage mount 48 move with the belt 56. The upper linkage mount 48 reciprocally moves along the length of slot 42 on the horizontal top framing element 38. The lower linkage mount 46 reciprocally moves along the length of the slot 40 in the inclined framing element 36.

The lower linkage mount 46 extends through the lower slot 40 in the inclined framing element 36. A first set of lower linkages 62 are provided, wherein the lower linkages 62 are anchored to the lower linkage mount 46. Depending upon the size and shape of the static base framework 14, the lower linkages 46 can contain between one and three linkage segments that are interconnected at pivot joints. In the shown embodiment, two linkage segments 64, 65 are shown that include a first linkage segment 64 and a second linkage segment 65. Likewise, the upper linkage mount 48 extends through the upper slot 42 in the horizontal top framing element 38. A second set of upper linkages 68 are provided, wherein the second set of linkages 68 are anchored to the upper linkage mount 48. Depending upon the size and shape of the static base framework 14, the upper linkages 68 can contain between one and three linkages. In the shown embodiment, two linkage segments 71, 72 are shown that include a third linkage segment 71 and a fourth linkage segment 72.

A cargo frame 70 is provided. The cargo frame 70 can have a variety of configurations but is preferably made of welded metal tubing. The cargo frame 70 has a configuration that progresses in a primary plane 75. That is, most all the structural elements of the cargo frame 70 are coplanar and extend in the primary plane 75. The cargo frame 70 contains a plurality of parallel lift tubes 74 that have open ends 76. Extension arms 78 are provided that extend into the open ends 76 of the lift tubes 74 in a telescoping manner. Both the lift tubes 74 and the extension arms 78 are in the primary plane 75. The extension arms 78 can terminate with a foot ledge 80 that extends at a perpendicular to the primary plane 75.

The extension arms 78 move in a reciprocal manner relative to the lift tubes 74. The movement of the extension arms 78 can be controlled using a manual crank or a secondary electrically powered linear actuator 86. In the shown embodiment, the extension arms 78 contain rack gearing 82 that is engaged by a pinion gear 84. The pinion gear 84 is selectively rotated either manually or by the motor of a linear actuator 86. Thus, the turning of the pinion gear 84 can either extend or retract the extension arms 78 relative to the lift tubes 74 and the remainder of the cargo frame 70. The pinion gears 84 can be interconnected by a common drive axle 88. In this manner, all the extension arms 78 can be extended in unison using the secondary linear actuator 86 or one manual hand crank.

In the alternative, it will be understood that the lift tubes 74 can be independently controlled. In this manner, a load can be lifted in an asymmetrical manner with one side of the load being lifted higher than the other. Such independent controls are useful in lifting long loads, such as ladders, wherein the ladder must be lifted in a manner that avoids contact with the side mirrors of the vehicle.

The cargo frame 70 contains support wheels 90 that enable the cargo frame 70 to rest upon or against the rigid base framework 14. Although the support wheels 90 are shown on the cargo frame 70, it will be understood that the support wheels 90 can be mounted on the rigid base framework 14 in the alternative. The cargo frame 70 is mechanically attached to the rigid base framework 14 by the lower linkages 62 and the upper linkages 68.

Figure 4:
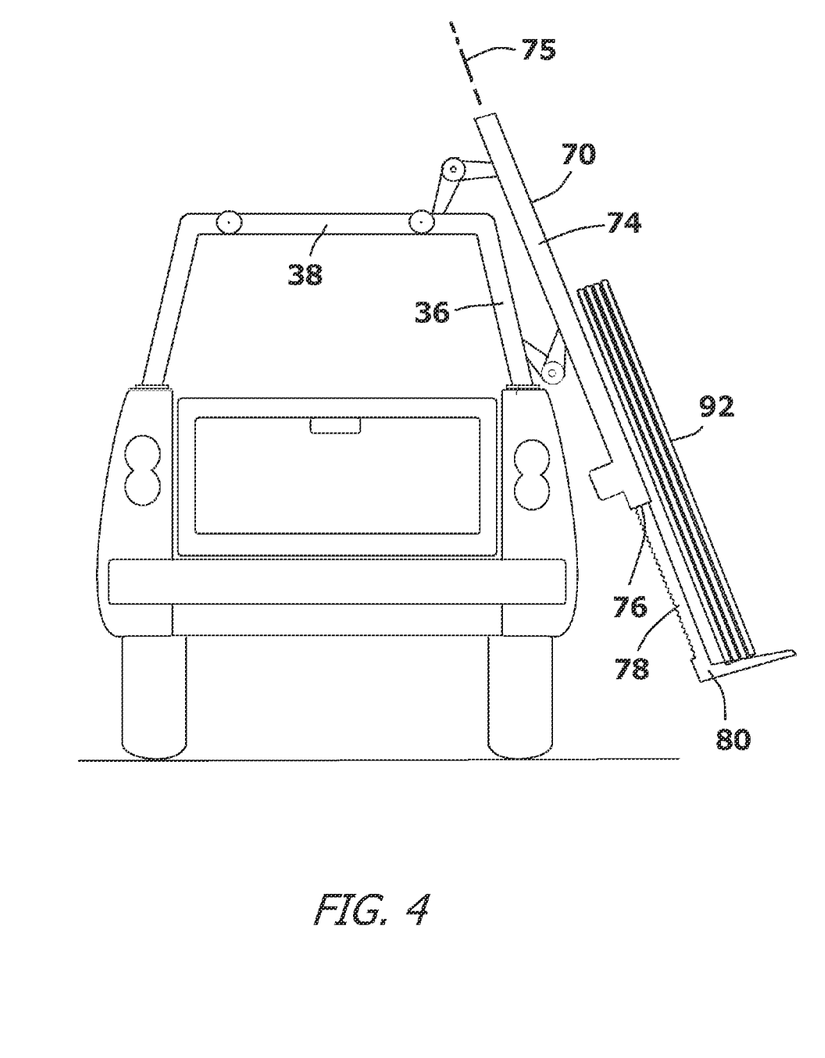
FIG. 4 is a rear view of the cargo rack system of FIG. 1 shown mounted on a truck and in a retracted configuration.

Referring to FIG. 4 in conjunction with FIG. 3 and FIG. 1, it can be seen that when the mechanical linear actuator 44 fully retracts the belt 56, the linkage mounts 46, 48 are moved to one end of the slots 40, 42 in the inclined framing element 36 and the horizontal top framing element 38. The lower linkage mount 46 is at the lowest point in the lower slot 40 of the inclined framing element 36. In this position, the lower linkages 62 and the upper linkages 68 move the cargo frame 70 so that the primary plane 75 of the cargo frame 70 is parallel to the inclined framing element 36 of the static base framework 14. In this extended configuration, the open ends 76 of the lift tubes 74 face downwardly toward the ground.

Figure 5:
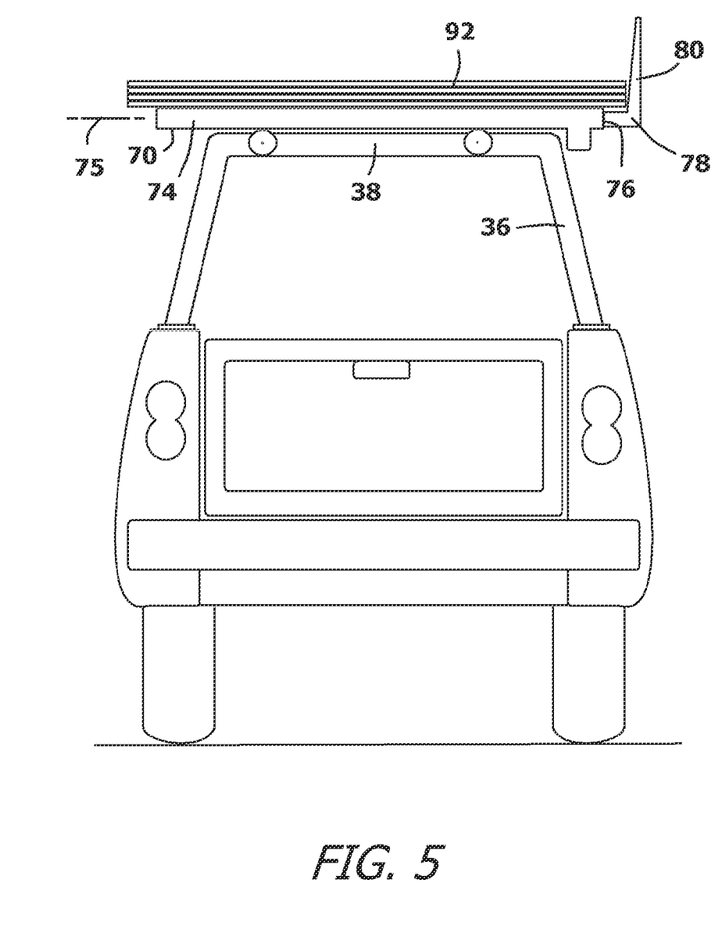
FIG. 5 is a rear view of the cargo rack system of FIG. 1 shown mounted on a truck and in its extended configuration.

Referring to FIG. 4 and FIG. 5, in conjunction with FIG. 1, FIG. 2 and FIG. 3, it can be seen that once the lift tubes 74 are oriented toward the ground, the extension arms 78 can be extended. This positions the foot ledges 80 even closer to the ground. Heavy objects, such as plywood, drywall, ladders or the like can then be placed on the foot ledges 80 without having to be lifted any significant height. Once a load 92 is placed onto the foot ledges 80 of the extension arms 78, the extension arms 78 are retracted into lift tubes 74. After the extension arms 78 are retracted, the mechanical linear actuator 44 is activated to move the upper and lower linkage mounts 46, 48 to the opposite ends of the slots 40, 42. This moves the lower linkages 62 and the upper linkages 68. The movement of the linkages 62, 68 moves raises and turns the cargo frame 70 so that the cargo frame 70 rests in a horizontal atop the top surface 20 of the static base framework 14. As such, the primary plane 75 of the cargo frame 70 is parallel to the top surface 20 of the static base framework 14. In this retracted configuration, the weight of the cargo frame 70 and its load 92 are transferred to the static base framework 14 via the support wheels 90.

Figure 6:
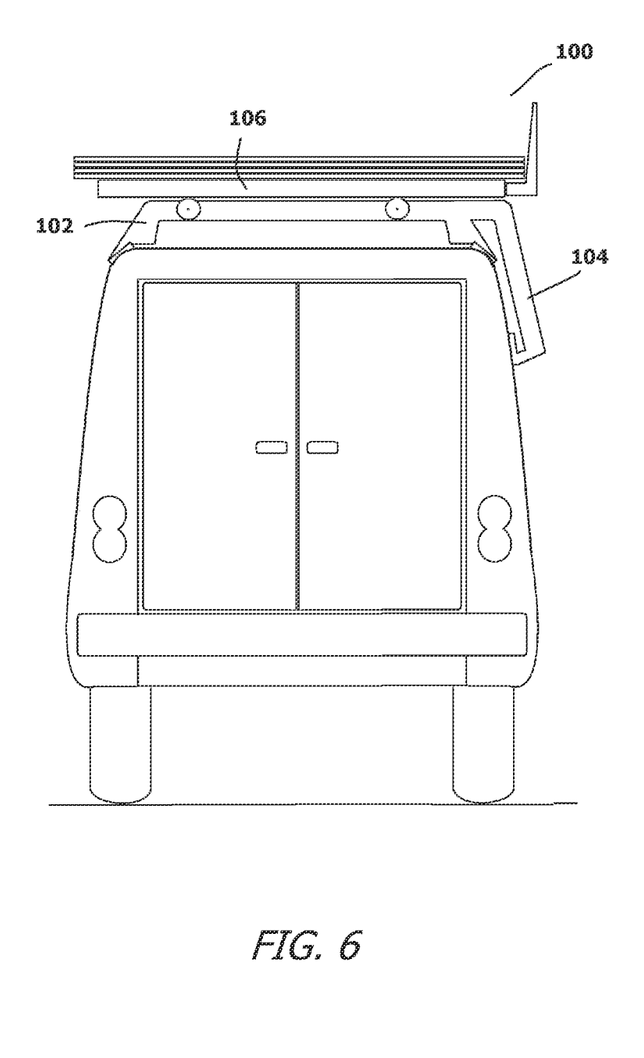
FIG. 6 is a rear view of a van containing an alternate embodiment of the cargo rack system in a retracted configuration.
Figure 7:
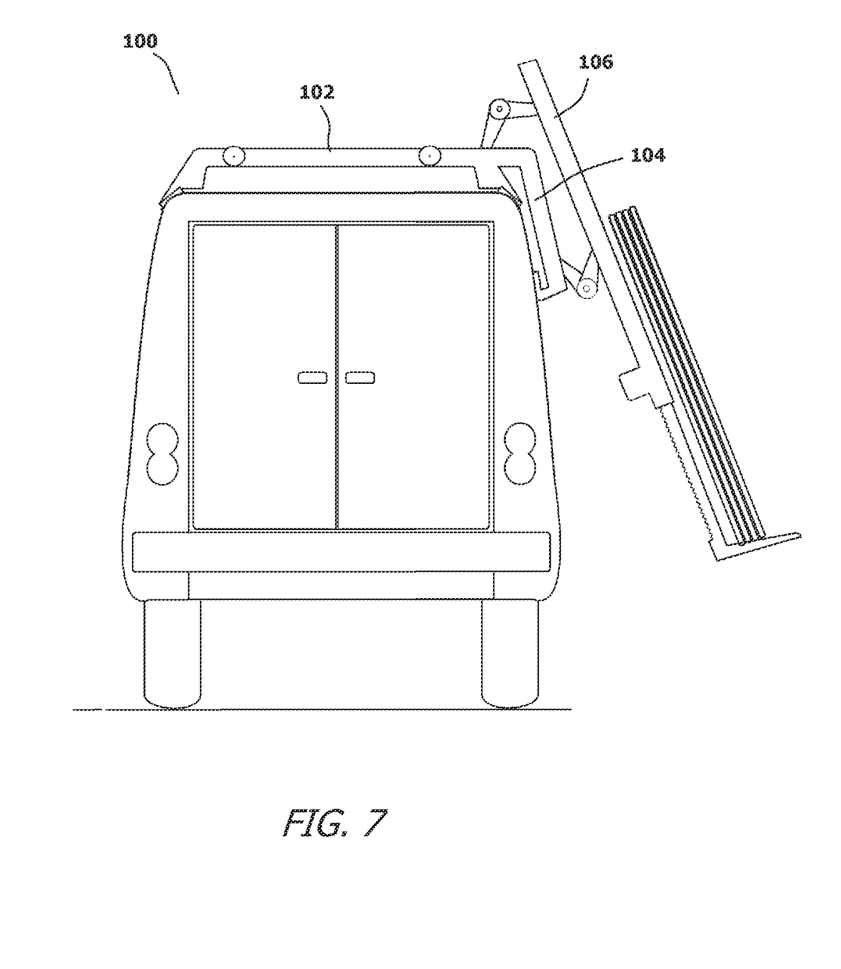
FIG. 7 is a rear view of a van containing an embodiment of the cargo rack system in an extended configuration.

In the prior embodiment, the cargo rack system 10 was mounted over the bed of a pick-up truck 12. Referring to FIG. 6 and FIG. 7, it can be seen that a version of the present invention cargo rack system 100 can be adapted for use on SUVs, vans and other vehicles with solid tops. In this embodiment, the static base framework 102 is shortened and is mounted to the roof of the vehicle instead of over the bed of a truck. The static base framework 102 contains an inclined framing element 104 that extends partially down the side of the vehicle. In the shown embodiment, the inclined framing element 104 extends at or near a vertical orientation. This enables the cargo rack system 100 to be applied to vans with vertical, or near vertical, sidewalls.

The lifting mechanism of the prior embodiment is present in the inclined framing element 104 and the static base framework 102. The lift mechanism moves a cargo rack 106 in the same manner as has been previously described. However, vans and panel trucks tend to be taller than they are wide. The extension arms that extend from the cargo rack 106 are modified to compensate for the additional height.

Figure 8:
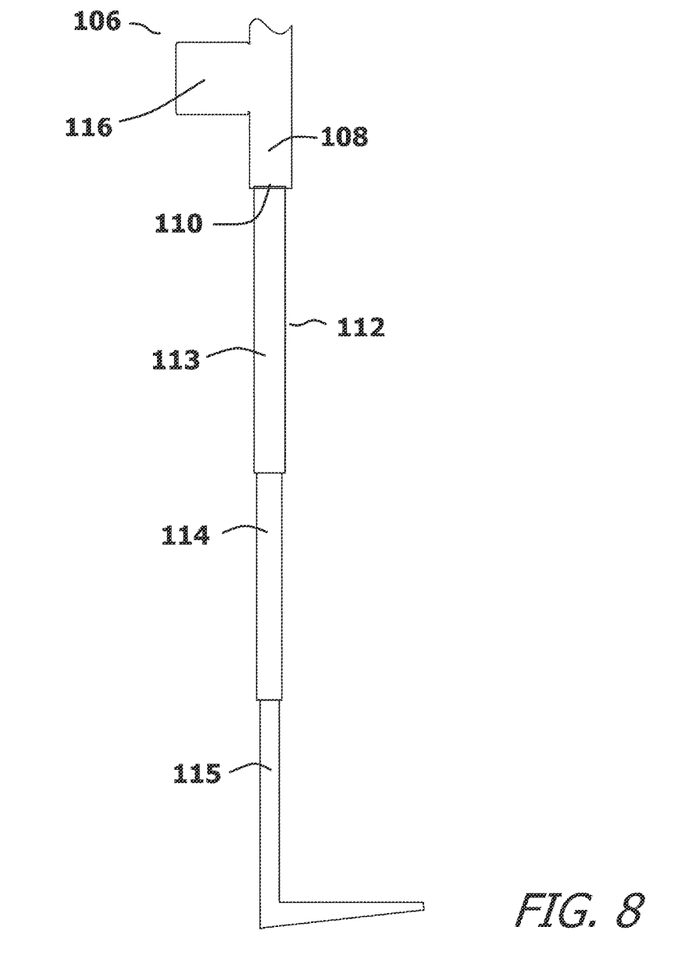
FIG. 8 is a cross-section of a first alternate embodiment of a lift mechanism incorporated into a cargo platform.

Referring to FIG. 8, the cargo frame 106 contains a plurality of parallel lift tubes 108 that have open ends 110. Extension arms 112 are provided that extend into the open ends 110 of the lift tubes 108 in a telescoping manner. In the shown embodiment, the extension arms 112 also have a telescoping configuration, wherein multiple segments 113, 114, 115 concentrically collapse and extend. This enables the extension arms 112 to extend to lengths that are much longer than the length of the lift tubes 108. The segments 113, 114, 115 of the extension arms 112 are extended and retracted using a motor 116. The motor 116 can be part of a linear actuator or a separate lift mechanism.

It is preferred that the cargo frame 106 contain at least two lift tubes with internal lift mechanisms. In this manner, the lift mechanisms can be separately operated. This enables one end of a load to be lifted higher than the other. In this manner, long loads and uneven loads can be better directed around the handles and mirrors of the vehicle.

Figure 9:
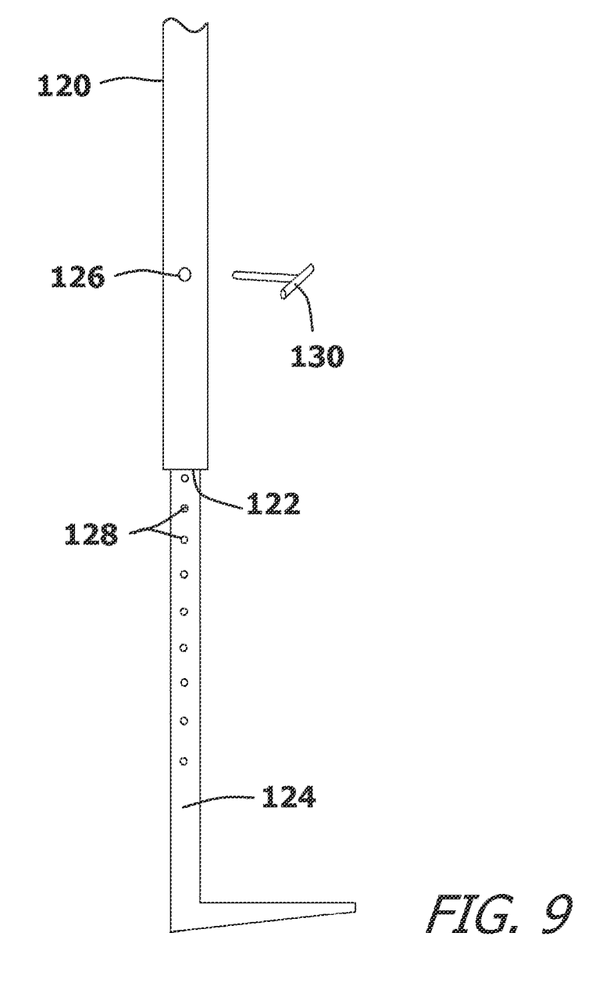
FIG. 9 is a cross-section of a second alternate embodiment of a lift mechanism incorporated into a cargo platform.

Referring to FIG. 9, a simplified structure of the lift tubes 120 is shown. In this embodiment, the lift tubes 120 that have open ends 122. Extension arms 124 are provided that extend into the open ends 122 of the lift tubes 120. The lift tubes 120 and the extension arms 124 may contain locking holes 126, 128 that can be aligned. A locking pin 130 is selectively set through the holes 126, 128 to manually set the extension arm 124 to different lengths.

It will be understood that the embodiments of the present invention that are illustrated and described are merely exemplary and that a person skilled in the art can make many variations to those embodiments. All such embodiments are intended to be included within the scope of the present invention as defined by the appended claims.

What is claimed is:

1. A cargo rack system comprising:
   a base framework having an inclined framing element and a horizontal framing element, wherein said inclined framing element and said horizontal framing element are hollow and interconnect to share a common interior;
   a first slot formed in said inclined framing element;
   a second slot formed in said horizontal framing element;
   linkage mounts disposed within said interior, wherein said linkage mounts include a first linkage mount accessible through said first slot and a second linkage mount accessible through said second slot;
   a belt disposed in said common interior of said inclined framing element and said horizontal framing element, wherein said first linkage mount and said second linkage mount are connected to said belt;
   a linear actuator supported by said base framework for reciprocally moving said belt in said common interior, wherein belt moves said first linkage mount under said first slot and moves said second linkage mount under said second slot;
   a cargo frame having a primary plane;
   a first set of linkages that connect said cargo frame to said first linkage mount through said first slot and a second set of linkages that connect said cargo frame to said second linkage mount through said second slot, wherein said first set of linkages and said second set of linkages move said cargo frame between a first configuration, wherein said primary plane of said cargo frame is parallel to said inclined framing element and a second configuration, wherein said primary plane of said cargo frame is parallel to said horizontal framing element, as said linkage mounts are moved by said belt.

2. The cargo rack system according to claim 1, wherein said cargo frame includes extension arms that can be selectively extended and retracted in said primary plane.

3. The cargo rack system according to claim 2, wherein said extension arms terminate with foot ledges that extend from said extension arms outside of said primary plane.

4. The cargo rack assembly according to claim 1, further including supports that support said cargo frame atop said base framework when said cargo frame is in said first configuration.

5. The cargo rack assembly according to claim 1, wherein said linear actuator reciprocally moves said belt within said common interior.

6. A cargo rack system comprising:
a base framework having trusses interconnected by crossbars, wherein said trusses have inclined framing elements and horizontal framing elements;
belts disposed within said trusses;
linear actuators supported by said base framework for reciprocally moving each of said belts within said inclined framing elements and said horizontal framing elements of said trusses;
mounts that are moved by said belts between a first position and a second position;
a cargo frame having a primary plane;
linkages that connect said cargo frame to said mounts, wherein said linkages move said cargo frame between a first configuration, wherein said primary plane is parallel to said horizontal framing elements and a second configuration where said primary plane is parallel to said inclined framing elements, as said mounts move between said first position and said second position.

7. The cargo rack system according to claim 6, wherein said inclined framing elements and said horizontal framing elements contain slots.

8. The cargo rack system according to claim 7, wherein said mounts travel between said first position and said second position while extending through said slots.

9. The cargo rack system according to claim 6, wherein said cargo frame includes extension arms that can be selectively extended and retracted in said primary plane.

10. The cargo rack system according to claim 9, wherein said extension arms terminate with foot ledges that extend from said extension arms outside of said primary plane.

11. The cargo rack system according to claim 6, further including supports that support said cargo frame atop said base framework when said cargo frame is in said first configuration.

12. The cargo rack system according to claim 6, wherein said inclined framing elements and said horizontal framing elements are hollow and interconnect to define common interiors.

13. The cargo rack system according to claim 12, wherein said linear actuators reciprocally move said belts within said common interiors.

14. A cargo rack system comprising:
a first truss having an inclined framing element and a horizontal framing element;
a second truss;
crossbars that extend between said first truss and said second truss forming a rigid framework having a horizontal top and an inclined side;
a belt disposed in said first truss;
a linear actuator supported by said rigid framework for reciprocally moving said belt in said first truss through at least part of said inclined framing element and said horizontal framing element;
a cargo frame having a primary plane;
linkages anchored to said belt that connect to said cargo frame, wherein said linkages move with said belt and move said cargo frame between a first configuration, where said primary plane is parallel to said horizontal top of said rigid framework and a second configuration where said primary plane is parallel to said inclined side.

15. The cargo rack system according to claim 14, wherein said inclined side and said horizontal top contain slots.

16. The cargo rack system according to claim 15, wherein said linkages attach to mounts that are moved by said belt between a first position and a second position, wherein said mounts extend through said slots.

17. The cargo rack system according to claim 14, wherein said cargo frame includes extension arms that can be selectively extended and retracted in said primary plane.

18. The cargo rack assembly according to claim 14, further including supports that support said cargo frame atop said rigid framework when said cargo frame is in said first configuration.

* * * * *